US012704825B2

(12) United States Patent
Pandey et al.

(10) Patent No.: US 12,704,825 B2
(45) Date of Patent: Aug. 11, 2026

(54) MEASUREMENT OF INHERENT SUBSTRATE DISTORTION

(71) Applicant: Applied Materials, Inc., Santa Clara, CA (US)

(72) Inventors: Piyush Kumar Pandey, Bangalore (IN); Prabal Sen, Bangalore (IN); Ganapathy Saravanavel, Madurai (IN); Himadri Shekhar Handsa, Bangalore (IN); Mohammed Dilkash Azam, Bangalore (IN); Sidharth Bhatia, Santa Cruz, CA (US)

(73) Assignee: Applied Materials, Inc., Santa Clara, CA (US)

( * ) Notice: Subject to any disclaimer, the term of this patent is extended or adjusted under 35 U.S.C. 154(b) by 344 days.

(21) Appl. No.: 18/223,506

(22) Filed: Jul. 18, 2023

(65) Prior Publication Data

US 2025/0028294 A1 Jan. 23, 2025

(51) Int. Cl.
*G05B 19/18* (2006.01)
*G05B 23/02* (2006.01)

(52) U.S. Cl.
CPC ....... *G05B 19/188* (2013.01); *G05B 23/0297* (2013.01); *G05B 2219/45031* (2013.01); *G05B 2223/06* (2018.08)

(58) Field of Classification Search
CPC .............. G05B 19/188; G05B 23/0297; G05B 2219/45031; G05B 2223/06
See application file for complete search history.

(56) References Cited

U.S. PATENT DOCUMENTS

| | | | | |
|---|---|---|---|---|
| 6,762,846 | B1 | 7/2004 | Poris | |
| 7,379,154 | B2 | 5/2008 | Bruls | |
| 9,748,148 | B2 | 8/2017 | Yieh | |
| 2007/0089670 | A1* | 4/2007 | Ikedo | C23C 16/4581 118/728 |
| 2015/0120216 | A1 | 4/2015 | Vukkadala et al. | |
| 2016/0290789 | A1* | 10/2016 | Smith | G01B 11/2441 |
| 2017/0287752 | A1 | 10/2017 | Godet | |
| 2017/0363969 | A1* | 12/2017 | Hauptmann | G01N 21/9501 |
| 2018/0342410 | A1* | 11/2018 | Hooge | H01L 21/027 |
| 2019/0013224 | A1 | 1/2019 | Chiba et al. | |

FOREIGN PATENT DOCUMENTS

CN 110807273 A 2/2020

OTHER PUBLICATIONS

International Search Report and Written Opinion for International Application No. PCT/US2024/038403, mailed Nov. 5, 2024, 10 Pages.

(Continued)

*Primary Examiner* — Christopher W Carter
(74) *Attorney, Agent, or Firm* — Lowenstein Sandler LLP

(57) ABSTRACT

A method includes obtaining first data indicative of a measured profile of a substrate. The method further includes obtaining second data indicative of a profile of a reference substrate. The method further includes determining a corrected substrate profile based on the first data and the second data. The method further includes performing a corrective action based on the corrected substrate profile.

19 Claims, 5 Drawing Sheets

(56) References Cited

OTHER PUBLICATIONS

Liu, H. et al. "Analysis of Factors Affecting Gravity-Induced Deflection for Large and Thin Wafers in Flatness Measurement Using Three-Point-Support Method"; Metrology and Measurement Systems, published online Dec. 7, 2015; pp. 531-546; vol. XXII (2015), No. 4.

Liu, H. et al. "Development of a Measuring Equipment for Silicon Wafer Warp"; Advanced materials Research; published online Sep. 27, 2013; pp. 561-565; vol. 797, Trans Tech Publications, Switzerland.

Natsu, W. et al. "Effects of support method and mechanical property of 300 mm silicon wafer on sori measurement"; Precision Engineering, published online Aug. 3, 2004; pp. 19-26, vol. 29 (2005).

* cited by examiner

MEASUREMENT OF INHERENT SUBSTRATE DISTORTION

TECHNICAL FIELD

Embodiments of the present disclosure relate to determination substrate distortion. Specifically, embodiments of the present disclosure relate to determination of inherent substrate distortion for substrate processing systems.

BACKGROUND

Chambers are used in many types of processing systems. Examples of chambers include etch chambers, deposition chambers, anneal chambers, metrology chambers, and the like. Typically, a substrate, such as a semiconductor wafer, is placed on a substrate support within the chamber and operations are performed to advance processing of the substrate. Detailed understanding of processing conditions, the effect of conditions on a substrate, and evolutions of these parameters over time enables tight control of product properties. Measuring one or more properties of a substrate (e.g., performing metrology operations) may inform decisions or actions associated with updating or maintaining processing conditions of substrates. One metric that may be useful to characterize is substrate distortion. Substrate distortion may be further related to other metrics of interest in substrate characterization.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one aspect of the present disclosure, a method includes obtaining first data indicative of a measured profile of a substrate. The method further includes obtaining second data indicative of a profile of a reference substrate. The method further includes determining a corrected substrate profile based on the first data and the second data. The method further includes performing a corrective action based on the corrected substrate profile.

In another aspect of the present disclosure, a non-transitory machine-readable storage medium stores instructions which, when executed, cause a processing device to perform operations including obtaining first data indicative of a measured profile of a substrate. The operations further include obtaining second data indicative of a profile of a reference substrate. The operations further include determining a corrected substrate profile based on the first data and the second data. The operations further include performing a corrective action based on the corrected substrate profile.

In another aspect of the present disclosure, a system includes memory and a processing device coupled to the memory. The processing device is configured to obtain first data indicative of a measured profile of a substrate. The processing device is further configured to obtain second data indicative of a profile of a reference substrate. The processing device is further configured to determine a corrected substrate profile based on the first data and the second data.

The processing device is further configured to perform a corrective action based on the corrected substrate profile.

Numerous other features are provided in accordance with these and other aspects of the disclosure. Other features and aspects of the present disclosure will become more fully apparent from the following detailed description, the claims, and the accompanying drawings.

BRIEF DESCRIPTION OF THE DRAWINGS

The present disclosure is illustrated by way of example, and not by way of limitation, in the figures of the accompanying drawings in which like references indicate similar elements. It should be noted that different references to “an” or “one” embodiment in this disclosure are not necessarily to the same embodiment, and such references mean at least one.

DETAILED DESCRIPTION OF EMBODIMENTS

Figure 1:
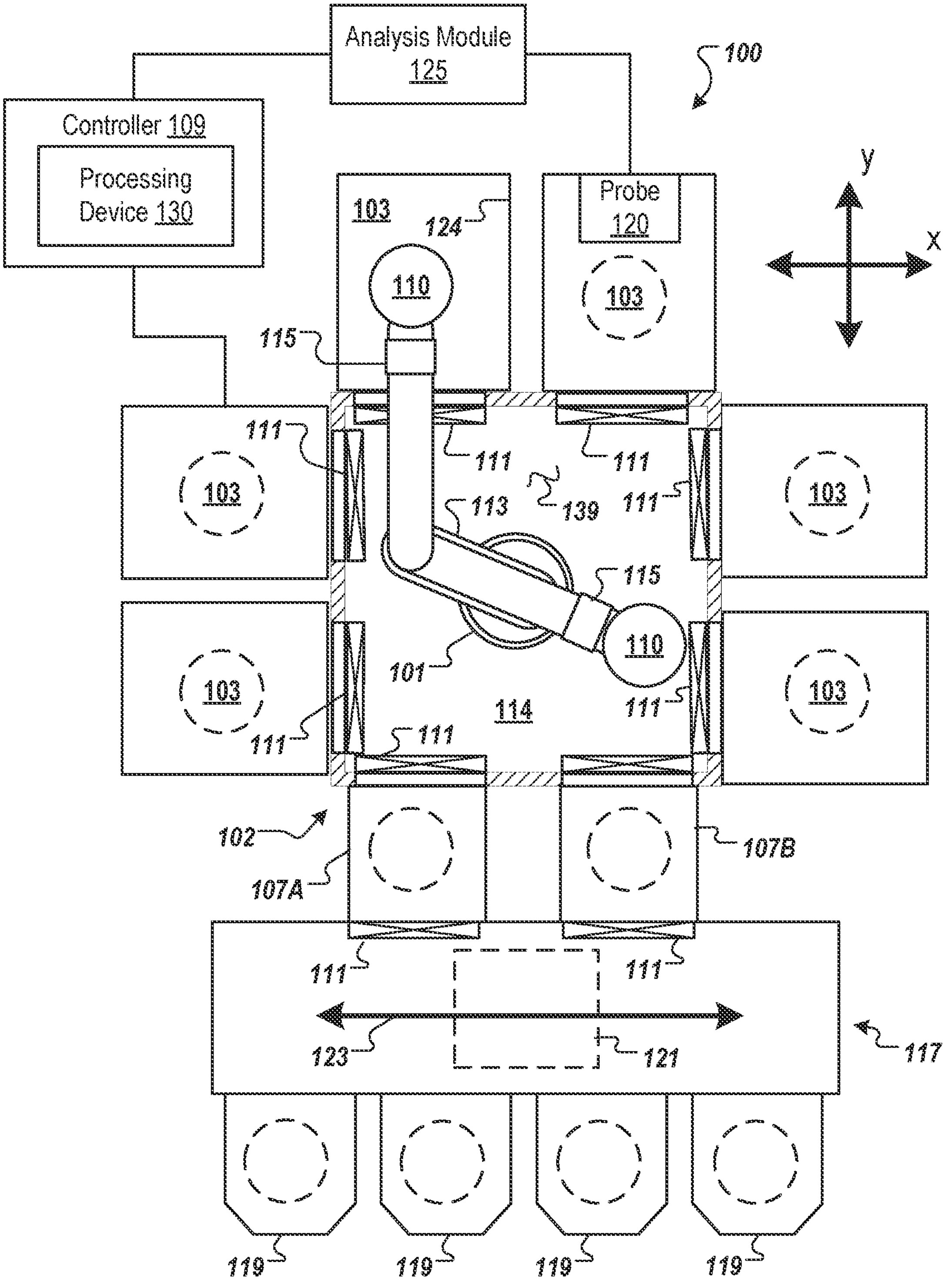
FIG. 1 is a top schematic view of an example processing system, according to some embodiments.

Described herein are methods and systems related to determining distortion, deflection, and/or warpage of a manufactured substrate. The disclosed methods and systems provide means for out-of-plane bowing and/or warping of a substrate, for example due to performance of one or more processing operations. Out-of-plane distortions may be used to determine in-plane distortions, overlay error, or other manufacturing faults that may impact efficacy of a manufactured device. Substrate out-of-plane distortion measurement may relate to quantification and correction of overlay error. Additionally, it also may enable quantification of non-idealities in the substrate’s shape such as bow and warpage. The quantification of non-idealities in substrate shape may help control the process parameters to improve manufacturing performance In some systems, measurement of substrate distortion may be performed. Measured substrate profiles and influenced by several factors. A measured substrate profile includes contributions from multiple effects. Contributions to measured substrate profiles may include deformation due to gravity. Contributions to measured substrate profiles may include inherent residual stress. Determining properties of the substrate may include isolating contributions to substrate profile measurements corresponding to gravity induced deformation from contributions of to substrate profile measurements corresponding to substrate warp.

In some systems, various strategies may be employed to separate substrate deflection due to inherent stress from substrate deflection induced by gravity. Strategies for separating contributions to substrate deflection include measuring a substrate from opposite sides. A first profile measurement may be made with a first side of the substrate facing up, facing toward a measurement device, or the like. The substrate may then be turned, and a second profile measurement made on a second side of the substrate. The two measurements with opposite influences from gravity may be used to determine intrinsic distortion of the substrate.

Strategies for separating contributions to substrate deflection include measuring substrates in an orientation that reduces gravitational influence to substrate distortion. A substrate may be disposed in a vertical position for measurement. A substrate disposed in a vertical position (e.g., a nominal plane occupied by the substrate intersecting a horizontal plane at a 90° angle) may experience less substrate distortion due to gravity than a substrate disposed in a horizontal position. Measurement may be performed with the substrate in a vertical position to isolate inherent stresses.

Strategies for separating contributions to substrate deflection include simulating gravity induced deflection to isolate deflection due to substrate stress. Simulating gravity induced deflection includes generating a model for simulating deflection of substrates. Simulating gravity induced deflection includes providing the deflection simulation model input corresponding to one or more properties of a substrate for simulating gravity induced deflection. A measured substrate profile may be used in conjunction with the simulated gravity induced deflection to determine inherent stress deflection of the substrate. Upon determining stresses of the substrate based on the out-of-plane distortion, corrective actions may be performed based on the out-of-plane distortion.

Conventional methods for determining distortion of substrates include one or more shortcomings. Position-dependent methods include practical challenges in repositioning the substrates for measurement. For example, a positioning method of accounting for gravity induced deflection may include flipping a substrate "upside down" for a profile measurement. In another example, a positioning-based method of accounting for gravity induced deflection may include disposing a substrate in a vertical orientation for measurement. There may be significant hardware costs associated with a system that is capable of repositioning a substrate in this way. Specialized robot arms, substrate supports or mounts, substrate handling appendages, etc., may be utilized for such systems. Additionally, there may be challenges associated with substrate placement in such a system. For example, handling of substrates in a manner that enables reorienting of the substrate may include using methods that may be more likely to damage a substrate. Handling of substrate in a manner that enables reorienting of the substrate may include methods that may be less precise for substrate placement, may be more likely to misplace a substrate or place a substrate outside of placement location specifications, or the like. Further, reorienting a substrate for profile measurements may be a time-consuming process. For example, in the case of a method including measuring two sides of a substrate, measurement time in generating a substrate profile may be doubled compared to measuring substrate deflection from a single side. Adjustments of the position and/or orientation of the substrate may further increase a time devoted to measurement, which may decrease throughput of the metrology system.

Evaluating gravity induced deflection based on simulations also has shortcomings. Simulating gravity induced deflection includes simulating the substrate, simulating the substrate support or stage, etc. Simulating gravity induced deflection may include generating numerical solutions to systems of equations, solving partial differential equations, performing numerical methods such as finite element analysis, or the like. Simulating gravity induced deflection may include providing to the model data associated with substrate characteristics, such as material composition, thickness, other material and/or geometric properties, etc. Simulating gravity induced deflection may include measuring, estimating, or otherwise determining such substrate properties to provide to the model for simulating gravity induced deflection. Measurements of substrate distortion based on simulating gravity induced deflection may be sensitive to positioning of the substrate, e.g., sensitive to positioning errors of the substrate.

Methods and systems of the present disclosure may address one or more shortcomings of conventional methods. In some embodiments, a method for determining a substrate distortion based on inherent stresses in disclosed. A substrate may be provided. A profile of the substrate may be measured. Measuring the profile may include obtaining displacement measurements of a plurality of locations of the substrate. The profile may be measured by scanning a displacement sensing device across the surface of the substrate. The displacement sensing device may be a confocal displacement sensor, a laser triangulation device, or another displacement sensing device. The profile may be impacted by both inherent substrate deformation and gravity induced deflection.

The profile may be measured while the substrate is in an orientation that is also used for substrate processing. For example, substrate processing operations may occur while the substrate is in a horizontal orientation, and the profile may be measured while the substrate is in a horizontal orientation. The profile may be measured while the substrate is supported by a profile measurement support device. For example, a substrate supporting device may be utilized that reduces deflection of the substrate due to gravity. In some embodiments, and extended stage (compared to a substrate processing stage) may be utilized. In some embodiments, a three-point support may be utilized.

In some embodiments, deflection due to gravity may be compensated for. Deflection due to gravity may be approximated using a reference substrate. A reference substrate may include a substrate including one or more features of the target substrate. For example, the reference substrate may be a bare silicon wafer of similar properties to the target substrate. The profile of the reference substrate may be measured, e.g., by the same or similar method to measuring the profile of the target substrate. The reference substrate may be measured while supported by a support that reduces gravitational deflection. The profile of the reference substrate may be used to isolate deformation of the target substrate due to substrate processing operations (e.g., film deposition) from deformation due to gravity.

In some embodiments, the target substrate may act as a reference substrate. For example, a profile of a substrate may be measured before a processing operation is performed. The substrate may then be provided for processing. For example, the substrate may be transferred from a metrology chamber to a process chamber for performance of a process operation on the substrate. The substrate may, for example, have a film deposited upon it in the process operation. After processing, the substrate profile may again be measured. By utilizing the measured profiles before and after processing, distortion of the substrate due to the processing operation may be separated from distortion due to gravity. Out-of-plane distortion may be determined based on measurements before and after one or more target processing operations to obtain deformation of the substrate induced by the one or more target processing operations.

In some embodiments, a determination of out-of-plane distortion may be performed based on the profile measurements of the target substrate and the reference substrate.

Out-of-plane distortion may be related to internal and/or inherent stresses of the target substrate, such as stresses induced by one or more films deposited on the substrate. Out-of-plane distortion may be utilized in quantifying in-plane distortion of the target substrate. In-plane distortion may be utilized in performance of a corrective action. For example, overlay error may be determined based on in-plane distortion. One or more corrective actions may be performed based on distortions determined in a target substrate.

Aspects of the present disclosure provide technological advances over conventional methods. Methods described herein enable operations of substrate profile measurements without adjusting an orientation of the substrate. Including means for adjusting orientation of a substrate may include significant hardware cost. For example, robots including arms for flipping and/or reorienting a substrate may introduce a high added cost to a manufacturing system. Further, adjusting an orientation of a substrate may take a significant amount of time, which may impact the throughput of the manufacturing system, throughput of the metrology system, quality of the metrology that can be performed in a target time, etc. Adjusting an orientation of the substrate may introduce errors into a manufacturing process. For example, a robot configured to reorient a substrate may damage the substrate during reorientation procedures. Further, by including additional operations of lifting and placing the substrate for measurement, a likelihood of placement error occurring is increased. By measuring displacement of a target substrate, measuring displacement of a reference substrate, and utilizing both displacement profiles to generate an indication of substrate-induced distortion, shortcomings of an orientation-dependent profile measurement may be avoided.

Methods described herein enable operations of substrate profile measurements without relying on simulations of gravity induced deflection. Evaluating gravity induced deflection using a simulation may include providing to the simulation model characteristics of the substrate contributing to gravity induced deflection. For example, characteristics of a deposited material may be provided to the simulation. Providing characteristics of the substrate to the model may include making additional measurements of the substrate. Characteristics that may be measured and provided may include deposited material, thickness of various films, material properties of various layers of the substrate, etching or lithography profiles, etc. Determining the characteristics for providing to the simulation model may be time consuming, difficult, and/or inconvenient. By measuring displacement of a target substrate, measuring displacement of a reference substrate, and utilizing both displacement profiles to generate an indication of substrate-induced distortion, shortcomings associated with simulating gravity induced deflection of a substrate may be avoided.

In one aspect of the present disclosure, a method includes obtaining first data indicative of a measured profile of a substrate. The method further includes obtaining second data indicative of a profile of a reference substrate. The method further includes determining a corrected substrate profile based on the first data and the second data. The method further includes performing a corrective action based on the corrected substrate profile.

In another aspect of the present disclosure, a non-transitory machine-readable storage medium stores instructions which, when executed, cause a processing device to perform operations including obtaining first data indicative of a measured profile of a substrate. The operations further include obtaining second data indicative of a profile of a reference substrate. The operations further include determining a corrected substrate profile based on the first data and the second data. The operations further include performing a corrective action based on the corrected substrate profile.

In another aspect of the present disclosure, a system includes memory and a processing device coupled to the memory. The processing device is configured to obtain first data indicative of a measured profile of a substrate. The processing device is further configured to obtain second data indicative of a profile of a reference substrate. The processing device is further configured to determine a corrected substrate profile based on the first data and the second data. The processing device is further configured to perform a corrective action based on the corrected substrate profile.

FIG. 1 is a top schematic view of an example processing system 100, according to some embodiments. Processing system 100 may be a substrate processing system. Processing system 100 includes a substrate processing apparatus (e.g., substrate processing tool, physical components for substrate processing operations) and one or more computing devices (e.g., processing devices). Processing system 100 includes a transfer chamber robot 101 and a factory interface robot 121 each adapted to pick and place substrates 110 (sometimes referred to as "wafers" or "semiconductor wafers") from or to a destination in an electronic device processing system such as the processing system 100 illustrated in FIG. 1. However, any type of electronic device substrate, mask, or other silica-containing substrate (generally referred to as "substrates" herein) may be conveyed and transferred by the disclosed robots. For example, the destination for the substrates 110 may be one or more chambers 103 and/or one or more of the load lock apparatus 107A, 107B that may be distributed about and coupled to a transfer chamber 114. As shown, substrate transfers may be through slit valves 111, for example. Chambers 103 may include process chambers, metrology chambers, lithography chambers, etc.

Processing system 100 may further include a mainframe 102 including the transfer chamber 114 and a number of chambers 103. A housing of the mainframe 102 includes the transfer chamber 114 therein. The transfer chamber 114 may include top wall (not shown), bottom wall (floor) 139, and side walls, and may include a controlled environment. The controlled environment may include vacuum conditions, a controlled pressure (e.g., different from ambient atmospheric pressure), a controlled gas environment (e.g., inert gas such as argon or nitrogen gas or a gas mix), or the like. In the depicted embodiment, the transfer chamber robot 101 is mounted to the bottom wall (floor) 139. However, the transfer chamber robot 101 could be mounted elsewhere, such as to the top wall.

In various embodiments, chambers 103 may be adapted to carry out any number of processes on substrates 110. The processes may include deposition, oxidation, nitration, etching, polishing, cleaning, lithography, metrology (e.g., integrated metrology), or the like. Other processes may be carried out as well. The load lock apparatus 107A, 107B may be adapted to interface with a factory interface 117 or other system component, that may receive substrates 110 from substrate carriers 119 (e.g., Front Opening Unified Pods (FOUPs)) that may be docked at load ports of the factory interface 117, for example. The factory interface robot 121 (shown dotted) may be used to transfer the substrates 110 between the substrate carriers 119 and each load lock apparatus 107A, 107B. Transfers of the substrates 110 may be carried out in any sequence or direction. The factory interface robot 121 may be identical (or similar) to the transfer chamber robot 101 in some embodiments, but may further include a mechanism to allow the factory interface robot to move in either lateral direction and indicated by arrow 123. Any other suitable robot may be used as the factory interface robot 121. In some embodiments, system 100 may be coupled to (e.g., interface with) a metrology system, e.g., an integrated metrology system, an inline metrology system, etc.

Processing system 100 can include an integrated measurement and/or imaging system. An integrated measurement or imaging system may be, for example, a system for measuring substrate distortion or deflection. Substrate distortion may be measured by generating measurements indicative of a profile of a substrate. Substrate distortion may be measured by measuring a distance between various locations of a substrate and a fixed point. Substrate distortion may be measured by utilizing a displacement sensor to determine a map of displacements of a number of locations of a substrate, and extrapolating the measurements to generate a digital representation of the profile (e.g., deflection profile, distortion profile) of the substrate.

An integrated measurement and/or imaging system may be connected to factory interface 117. Alternatively, a measurement and/or imaging system may be connected to transfer chamber (e.g., at a location of one of the illustrated chambers 103). Alternatively, the measurement and/or imaging system may be positioned in an interior of the factory interface 117 or transfer chamber 114. A measurement and/or imaging system may also be a standalone system that is not connected to processing system 100. A measurement and/or imaging system may be mechanically isolated from factory interface 117 and from an external environment to protect the measurement and/or imaging system from external vibrations. In some embodiments, the measurement and/or imaging system and its contained components may provide analytical measurements (e.g., thickness measurements) that may provide a profile across a surface of a substrate, such as a thickness uniformity profile, a particle count profile, a CD profile, a CD uniformity profile, an optical constant profile, a material property profile, and so on. The measurement system may provide measurements indicative of bowing, warping, or other distorted properties of the substrate. The measurement system may provide measurements of out-of-plane distortion of a substrate, e.g., a nominally planar substrate. The measurement system may provide measurements of a reference substrate. The measurement system may provide measurements of a target substrate. The measurement system may provide measurement of a substrate before and/or after a target process operation, e.g., to determine the effect on wafer distortion of a film deposition operation. The measurement and/or imaging system may provide feedback to a user regarding the uniformity profile. Such metrology may be used to monitor process drift, out-of-specification film distortions, out-of-specification CD, CD-bias, etc. for etch, deposition, and/or other processes. The results of the measurement may be used to quickly correct or adjust process parameters of one or more process recipes executed on one or more process chambers to account for any determined process drift. Additionally, the results of the measurements may be used to determine when to perform maintenance on a process chamber, when to perform further testing on a substrate, when to flag a substrate as being out-of-specification, when to adjust a process recipe for future products, and so on.

In embodiments, and by way of exemplified explanation for any robot, the transfer chamber robot 101 includes at least one arm 113 (e.g., a robot arm) and at least one end effector 115 coupled to the arm 113. The end effector 115 is controllable by the transfer chamber robot 101 in order to pick up a substrate 110 from a load lock apparatus 107A or 107B, guide the substrate 110 through one of the slit valves 111 of a chamber 103, and accurately place the substrate 110 onto a substrate support of the chamber 103. In some embodiments, end effector 115 may include a blade for supporting substrate 110.

Any substrate transfer system (e.g., robot) may include one or more motors for moving at least a portion of the transfer system. For example, a motor may be utilized to extend one or more arms for transferring substrates in and out of various process chambers, metrology chambers, load lock chambers, or the like. A motor may be utilized to enable factory interface robot 121 to travel linearly between various substrate carriers 119.

In some embodiments, further robots may be present within one or more of the chambers 103. For example, a chamber including one or more metrology apparatuses may include a stage for moving a substrate within the metrology apparatuses. The stage may be utilized for adjusting a portion of a substrate that is within a field of view of a metrology apparatus. In some embodiments, one or more motors may be associated with the stage. One or more motor associated with the stage may be linear motors. For example, a metrology system may include a stage with one linear motor for generating linear motion of the substrate and one rotational motor for generating rotational motion of the substrate.

In some embodiments, a stage in a chamber 103 may be configured for operations to be performed in that chamber 103. For example, a metrology chamber may include a stage designed for making measurements of the substrate. A metrology chamber for determining substrate distortion (e.g., out-of-plane distortion) may include a stage configured to reduce deflection of the substrate due to gravity, e.g., to improve measurement of distortion due to film stresses. A metrology chamber may include a three-point substrate support. A metrology chamber may include a substrate support that provides support to the substrate in locations that are further from the center of the substrate than a conventional substrate support, for example. A metrology chamber may include a measurement stage (e.g., a substrate support designed for measurement) disposed on a conventional or processing stage.

In various embodiments, one or more of the chambers 103 may include a probe 120 (e.g., a device for collecting electromagnetic radiation), at least a part of which is within a chamber 103 of processing system 100. In some embodiments, probe 120 may be within a chamber 103 (as shown). In some embodiments, probe 120 may be within transfer chamber 114. In some embodiments, probe 120 may be within a slit valve assembly that includes slit valve 111. In some embodiments, probe 120 may be within a load lock 107A-B. In some embodiments, probe 120 may be within factory interface 117. In some embodiments, probe 120 may include optical components designed to couple radiation collected from within a chamber of processing system 100 and couple that radiation into one or more fiber optic cables/cores. In some embodiments, probe 120 may be disposed above a path of a substrate (e.g., may be suspended from or embedded in a top wall of processing system 100). In some embodiments, probe 120 may be disposed below a path of a substrate. In some embodiments, multiple probes may be included in a processing system 100, chamber 103, transfer chamber 114, etc.

In some embodiments, a field of view of the probe (e.g., a spatial region from which the probe is configured to receive electromagnetic radiation) may intersect with a path of substrate 110, a path of end effector 115, may be proximate to a coupling between chambers (e.g., proximate to slit valve 111), etc. In some embodiments, probe 120 may be configured to receive radiation reflected from a surface of the substrate. In some embodiments, probe 120 is configured to receive radiation transmitted through the substrate. In some embodiments, probe 120 is configured to receive radiation emitted by the substrate. In some embodiments, probe 120 may include an array of devices, e.g., devices with different (overlapping, non-overlapping, or the like) fields of view, devices with different functions (e.g., devices that receive radiation of different portions of the electromagnetic spectrum, devices that are configured to receive reflected, emitted, or transmitted light, etc.

In some embodiments, probe 120 may further include or be coupled to a source of electromagnetic radiation, and be configured to receive electromagnetic radiation from a surface of the substrate. In some embodiments, radiation or light received by probe 120 may be directed to analysis module 125. Analysis module 125 may be a spectrometer, one or more photodetectors, or the like. Light received by probe 120 may be focused into a fiber optic cable that is coupled to analysis module 125 for analysis, e.g., spectral analysis. Analysis module 125 may perform operations (e.g., analysis module 125 may include or be coupled to a processing device) to determine one or more spectra of the light that may be used to determine at least one property of the substrate. In some embodiments, radiation/light will be received from the substrate before substrate processing. In some embodiments, light will be received from the substrate after substrate processing. In some embodiments, light will be received from the substrate between processing operations. The probe 120 and analysis module 125 may comprise an optical sensor associated with the chamber 103, with the transfer chamber 114, with processing system 100, etc. Probe 120 and analysis module 125 may comprise a metrology system to be operated in a controlled environment. Probe 120 and analysis module 125 may comprise an in-vacuum metrology system. The optical sensor may detect at least one property of a material of substrate 110. The optical sensor may detect a distance (e.g., displacement) between probe 120 and an upper surface of a substrate. The optical sensor may be utilized to measure a distortion profile of the substrate. In some embodiments, by way of a calculation by a processing device (e.g., processing device 130), the optical sensor may provide sensor data indicative of the properties of a substrate. For example, the optical sensor may be used to measure relative heights of a number points of the surface of the substrate, and processing device 130 may be used to generate a digital profile of the substrate based on the measurements. The optical sensor may be used to classify, analyze, and/or characterize a pattern of a patterned substrate.

In some embodiments, processing system 100 may further include a source of electromagnetic radiation, e.g., that is optically coupled to probe 120 (e.g., probe 120 is configured to receive radiation generated by the source). In some embodiments, light received by probe 120 may be reflected from substrate 110. In some embodiments, radiation may be provided to substrate 110 from a location near probe 120, from a fiber core bundled with a fiber cord of probe 120, from the same side of substrate 110 (e.g., top side, bottom side, etc.) as probe 120, etc. Radiation may be provided to substrate 110 by a radiation coupling device that is embedded in a wall of the chamber, supported by a bottom wall of the chamber (e.g., bottom wall 139), suspended from a top wall of the chamber, etc. Light received by probe 120 may be transmitted through substrate 110. Radiation may be provided to substrate 110 from a location disposed opposite (e.g., with respect to substrate 110) from probe 120. For example, probe 120 may be suspended from and/or near a top wall of processing system 100, and radiation may be provided from near the bottom wall 139. In some embodiments, the system may include multiple probes, may include one or more arrays of probes, may include probes disposed above and/or below the substrate, etc.

A controller 109 (e.g., a tool and equipment controller) may control various aspects of the processing system 100, e.g., gas pressure in the chamber 103, individual gas flows, spatial flow ratios, temperature of various chamber components, and radio frequency (RF) or electrical state of the chamber 103. Controller 109 may receive signals from and send commands to the factory interface robot 121, the transfer chamber robot 101, one or more sensors, and/or other processing components of processing system 100. Controller 109 may thus control the initiation and cessation of processing, may adjust a deposition rate, type or mix of deposition composition, and the like. The controller 109 may further receive and process sensing data from various sensors, e.g., sensors associated with processing system 100, sensors of various motors generating position error data, etc. Controller 109 may further control aspects of analysis module 125, probe 120, etc.

Processing device 130 may perform various operations for determining substrate distortion. Processing device 130 may perform substrate distortion determination operations based on data received from analysis module 125. Processing device 130 may perform operations in generating a profile of a substrate. Processing device 130 may perform operations in determining out-of-plane distortion of the substrate. Processing device 130 may perform operations in determining in-plane distortion of the substrate. Processing device 130 may perform operations in determining overlay error of the substrate. Processing device 130 may perform operations in determining a corrective action to be performed based on the profile of the substrate.

Controller 109 and/or processing device 130 may be and/or include a computing device such as a personal computer, a server computer, a programmable logic controller (PLC), a microcontroller, and so on. The controller 109 and/or the processing device 130 may include (or be) one or more processing devices, which may be general-purpose processing devices such as a microprocessor, central processing unit, or the like. More particularly, the processing device may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device may also be one or more special-purpose processing devices such as an application specific integrated circuit (ASIC), a field programmable gate array (FPGA), a digital signal processor (DSP), network processor, or the like. Controller 109 and/or processing device 130 may include a data storage device (e.g., one or more disk drives and/or solid state drives), a main memory, a static memory, a network interface, and/or other components. Processing device 130 may execute instructions to perform any one or more of the methodologies and/or embodiments described herein. The instructions may be stored on a computer readable storage medium, which may include the main memory, static memory, secondary storage and/or processing device (during execution of the instructions).

Performing manufacturing processes that result in defective products can be costly in time, energy, products, components, wear on manufacturing equipment, the cost of identifying the defects and discarding the defective product, etc. By measuring a substrate profile and performing a corrective action based on the profile, a processing system can have the technical advantage of avoiding the cost of producing, identifying, and discarding defective products.

Performing manufacturing processes that result in failure of the components of the manufacturing equipment can be costly in downtime, damage to products, damage to equipment, express ordering replacement components, etc. By measuring a substrate profile and performing a corrective action based on the profile, a processing system can have the technical advantage of avoiding the cost of one or more of unexpected component failure, unscheduled downtime, productivity loss, unexpected equipment failure, product scrap, or the like. Monitoring the performance over time of components, e.g., of manufacturing equipment, sensors, metrology equipment, and the like, may provide indications of degrading components.

Manufacturing parameters may be suboptimal for producing product which may have costly results of increased resource (e.g., energy, coolant, gases, etc.) consumption, increased amount of time to produce the products, increased component failure, increased amounts of defective products, increased environmental impact, etc. By measuring a substrate profile and performing a corrective action based on the profile, a processing system can have the technical advantage of using optimal manufacturing parameters (e.g., hardware parameters, process parameters, optimal design) to avoid costly results of suboptimal manufacturing parameters.

Figure 2:
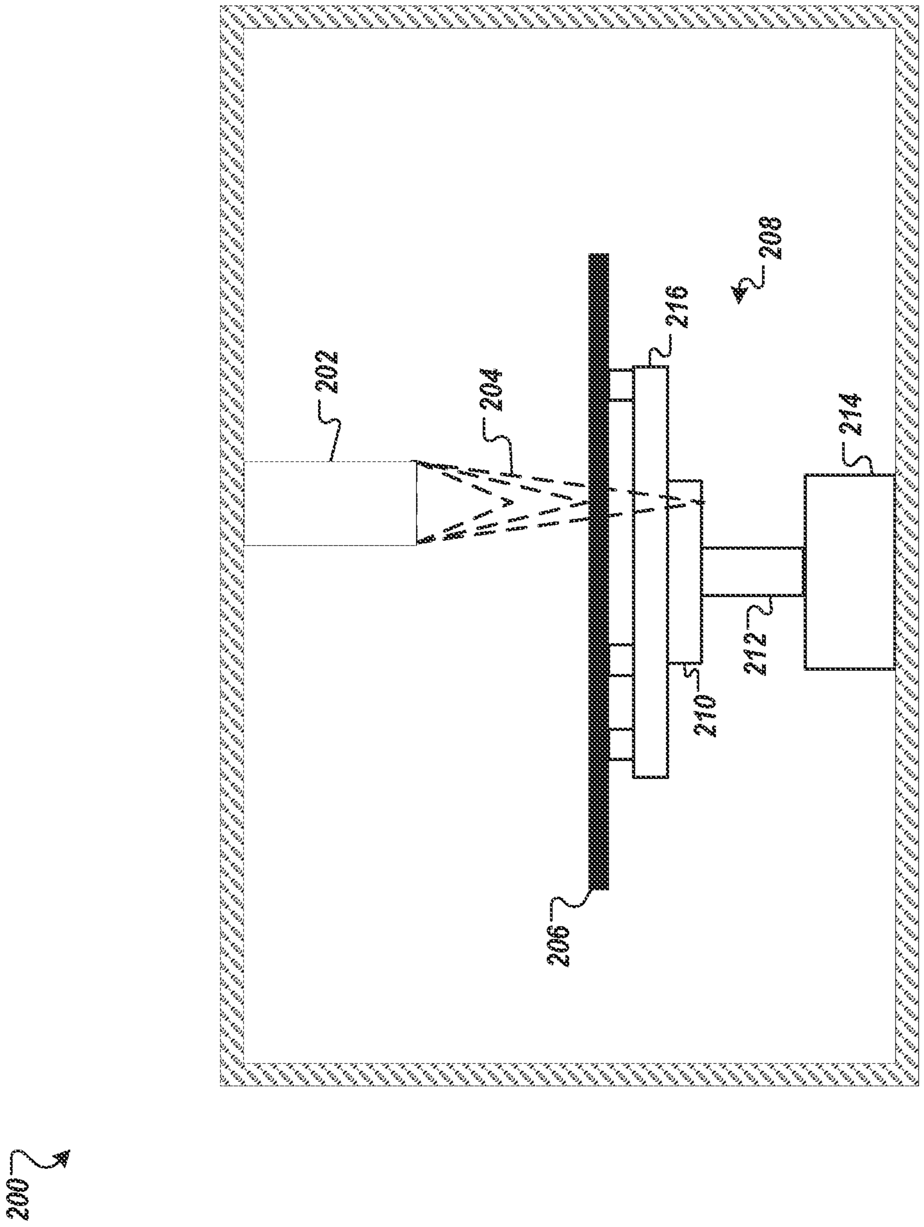
FIG. 2 depicts a metrology system for measuring a substrate profile, according to some embodiments.

FIG. 2 depicts a metrology system 200 for measuring a substrate profile, according to some embodiments. Metrology system 200 may be included in a chamber of a processing system, such as one of the chambers 103 of FIG. 1. Metrology system 200 includes metrology device 202. The metrology device 202 may be or include a probe for measuring or monitoring one or more properties of substrate 206. Metrology device 202 may include one or more sources of electromagnetic radiation. Metrology device 202 may include one or more sensors of electromagnetic radiation. Metrology device 202 may include one or more of optical sensors, IR sensors, etc. Metrology device 202 may measure one or more properties of a substrate 206. Metrology device 202 may include a reflectometry device. Metrology device 202 may be or include an interferometer device. Metrology device 202 may further be coupled to a spectrometer, an analyzer, a computer or processing device, etc.

Metrology device 202 may be a device configured to determine a distance between metrology device 202 and a target surface, such as a surface of substrate 206. One example of such a device is a confocal displacement sensor. A confocal displacement sensor is a non-contact measurement device used to determine the distance or displacement between the sensor and a target surface. It operates based on the principle of confocal microscopy, which is a technique used to capture and analyze optical signals from a specific focal plane.

Metrology device 202 may be a laser displacement sensor. Operation of an example laser displacement sensor utilizes a light source, typically a laser diode, to emit a beam of light. The emitted light beam passes through a beam splitter, which divides the light into two separate paths. One portion of the beam is directed towards an objective lens. The objective lens focuses the light onto the target surface. When the focused light beam strikes the target surface, a portion of the light is reflected back. The reflected light reenters the sensor and passes through a pinhole aperture. The pinhole aperture is strategically placed at a confocal distance from the target surface, such that only the light reflected from the focal plane of the objective lens will pass through the pinhole. The light that passes through the pinhole is captured by a photodetector. The photodetector converts the light signal into an electrical signal. Processing algorithms determine the position of the target surface based on the intensity of the reflected light. The laser displacement sensor may scan over various regions of the surface of the substrate to generate a profile of displacements of the substrate surface.

Metrology device 202 may be a chromatic or white-light confocal displacement sensor. Operation of an example chromatic confocal displacement sensor includes a white light source, instead of a laser source. This source emits a broad spectrum of wavelengths. The white light passes through a series of optical components, including lenses and a wavelength separation device, such as a diffraction grating. The diffraction grating disperses the white light into its constituent wavelengths. The dispersed light is then focused onto the target surface using a lens in the measurement probe. The lens focuses the different wavelengths of light at slightly different focal lengths, as depicted in FIG. 2 by the various focal cones 204. When the light hits the target surface, at least a portion of the incident light reflects back. The reflected light is collected by the measurement probe and directed towards a spectrometer. The spectrometer separates the collected light based on its wavelength. The spectrometer measures the intensity of various wavelengths included in the reflected light. By comparing the intensities of different colors, the sensor can determine the distance or displacement between the sensor and the target surface.

Metrology device 202 may be a laser triangulation device. Operation of an example laser triangulation device includes a laser beam that is emitted from the device and directed towards the target surface. The laser beam hits the target surface and is at least partially reflected back towards the sensor. A position-sensitive detector (PSD), such as a linear Charge-Coupled Device (CCD) or a Complementary Metal-Oxide-Semiconductor (CMOS) sensor, is used to capture the reflected light. The PSD may include multiple photosensitive elements arranged in a line. The reflected laser light falls on the PSD, and each photosensitive element detects the intensity of the light it receives. The position of maximum light intensity corresponds to the position of the laser spot on the PSD. The distance or displacement between the sensor and the target surface is calculated based on the principle of triangulation. The laser spot on the target surface forms a triangle with the sensor and the PSD. By measuring the position of the laser spot on the PSD, the sensor can determine the angle of the reflected beam and the distance between the sensor and the target surface.

Metrology device 202 may be or include any device capable of measuring a displacement between the device and the surface of the target substrate 206.

Metrology system 200 further includes substrate support 208. Substrate support 208 may include stage 210 and pedestal 212. Substrate support 208 may include a device for holding a substrate, such as a vacuum chuck, electrostatic chuck, mechanical chuck, magnetic chuck, or the like. Substrate support 208 may include a plate or other surface with a substrate-shaped pocket or a set of pins surrounding a substrate placement zone for securing a substrate position on the substrate support 208. Metrology system 200 further includes stage motor 214. Stage motor 214 is utilized in repositioning substrate 206. Stage motor 214 may be coupled to (e.g., travel with) substrate support 208, stage motor 214 may remain stationary and drive substrate support 208, etc.

In some embodiments, substrate support 208 may be configured to be moved in multiple dimensions. Substrate support 208 may include a number of stage motors (e.g., actuators) that are configured to move substrate support 208. Through this disclosure, the word "motor" is used for describing means for performing substrate relocation, though methods of the disclosure may be applicable to other means of relocating a substrate. Substrate support 208 may adjust a position of substrate 206 in order to bring a target portion of substrate 206 into field of view of metrology device 202. Substrate support 208 may adjust a position of substrate 206 in order to make measurements at multiple locations of substrate 206, e.g., spread around the surface of substrate 206. In some embodiments, each motor may be configured to generate one dimension of motion. For example, a first motor may generate motion of substrate support 208 in an "x" dimension, and a second motor may generate motion of the substrate support 208 in a "y" dimension. In another example, a first motor may generate motion of substrate support 208 in a first linear dimension, and a second motor may generate rotation motion of substrate support 208. Stage 210 may be a stage that enables two independent linear motions (e.g., "x" and "y" motion) and rotation motion. A first actuator may be a linear actuator, and a second actuator may be a rotational actuator.

Substrate support 208 may further include measurement stage 216. Measurement stage 216 may be configured for supporting a substrate while one or more measurements are being performed on the substrate, e.g., via metrology device 202. Measurement stage 216 may be configured to reduce and/or minimize deflection of substrate 206 due to gravity. For example, measurement stage 216 may be configured to support substrate 206 at positions further from the center of substrate 206 than stage 210. Measurement stage 216 may be a three-point support stage. Measurement stage 216 may support substrate 206 at a radius selected to reduce gravitational deflection of substrate 206, e.g., at a radius related to the radius of the substrate by a factor of the square root of two.

Substrate 206 may be moved relative to metrology device 202 (e.g., by stage motor 214) to enable measurement of displacement of substrate 206 at a number of locations. The displacement measurements may be used to generate a profile of the substrate. The substrate may be scanned in any manner, such as a grid pattern, a radial pattern, a spiral pattern, or the like. The profile measured of substrate 206 may be influenced by both gravitational deflection and any internal forces of substrate 206. Substrate 206 may be a target substrate (e.g., a semiconductor wafer, a manufactured product, etc.). Substrate 206 may be a reference substrate. A reference substrate and a target substrate may be measured under similar conditions, e.g., while supported by the same measurement stage 216.

Metrology system 200 may be included in a metrology chamber. Metrology system 200 may be part of a metrology chamber that is coupled to a substrate processing tool. Metrology system 200 may be part of an integrated metrology system. Metrology system 200 may be part of a chamber that is not a dedicated metrology chamber, e.g., a transfer chamber, a process chamber, etc. Metrology system 200 may be part of an in-line metrology system. Position error data may be used in assisting metrology operations of metrology system 200. Position error data may be used in performing and/or recommending corrective actions in association with the metrology system 200.

Figure 3:
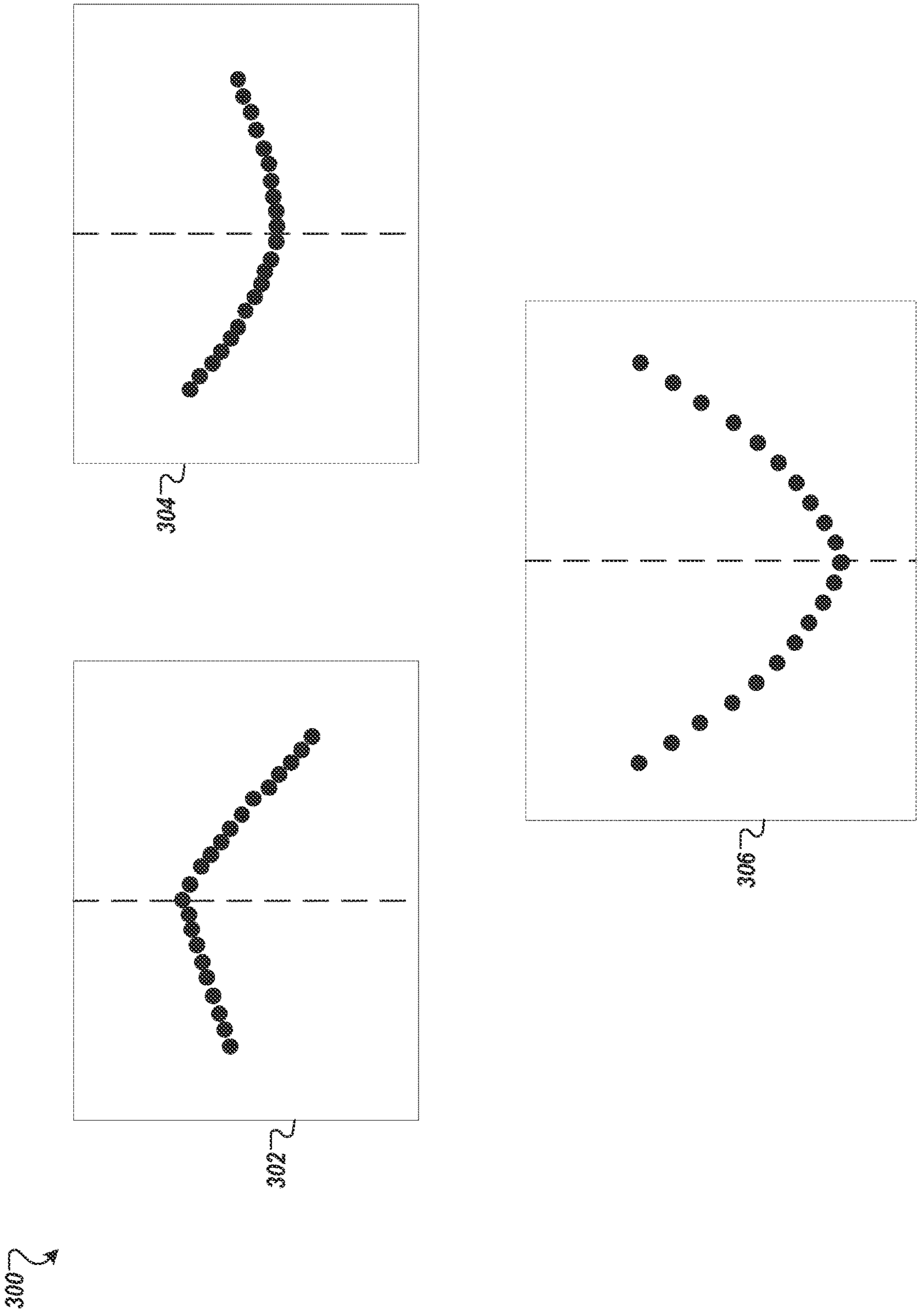
FIG. 3 depicts out-of-plane deformation measurements of substrates, according to some embodiments.

FIG. 3 depicts displacement measurements of substrates, according to some embodiments. FIG. 3 includes a plot of reference substrate measurements 302. FIG. 3 further includes a plot of target substrate measurements 304. FIG. 3 further includes a plot of corrected target substrate measurements 306.

Reference substrate plot 302 includes a set of data points indicating a shape of a measured reference wafer. The data presented in plots 302, 304, and 306 may be collected by a displacement sensor. The data presented in the plots indicate a height of various positions of the surface of the substrate. The data presented may correspond to, for example, displacement measurements made across a target diameter of the substrates. Data presented in plots 302 and 304 may have been collected in a metrology chamber of a processing system. Data presented in plots 302 and 304 may have been collected by a measurement system. Data presented in plots 302 and 304 may have been collected by a displacement sensor. Data presented in plots 302 and 304 may have been collected by a confocal displacement sensor. Data presented in plot 306 may be corrected data, based on data of plots 302 and 304.

Plot 302 includes measurements of a reference substrate. The reference substrate may be substantially flat, e.g., the reference substrate may have negligible inherent distortion, negligible inherent stress, or the like. Bowing of the reference substrate may be substantially due to gravity (e.g., inherent distortion may be below a threshold, below measurement error, below a threshold of interest, etc.). In some embodiments, the reference substrate may be a bare silicon substrate. The reference substrate may be selected to be similar by one or more metrics to a target substrate. In some embodiments, the reference substrate may be the target substrate before a target process operation is performed, and the target substrate may be measured after the process operation of interest is performed. Utilizing a substrate as measured before performance of one or more target process operations as a reference substrate, to be compared to measurements performed after the one or more target process operations enables determining deformation of the substrate induced by the one or more target process operations.

Plot 304 includes measurements of a target substrate. The target substrate may be a substrate of interest different than the reference substrate. The target substrate may be a substrate of interest at a different stage of processing than the reference substrate. The reference substrate may be the same substrate as the target substrate, at a different stage of substrate processing, which may enable determination of out-of-plane distortion induced by the intervening stages of substrate processing.

Measurements of plots 302 and 304 may indicate relative heights of various locations of the measured substrate. Measurements of plots 302 and 304 may indicate a wafer shape or profile of the measured substrates. Measurements of plots 302 and 304 may indicate deflection or distortion of the measured substrates. Measurements of plot 304 will be influenced by at least two factors: deflection of the substrate due to gravity and deflection of the substrate due to inherent stress (e.g., associated with one or more films deposited on the substrate). The reference substrate may be chosen to be sufficiently similar to the target substrate that deflection of the reference substrate can be used to determine deflection due to gravity of the target substrate. For example, a measured profile of the reference substrate may be subtracted (or otherwise accounted for) from a measured profile of the target substrate to generate a corrected profile, displayed in plot 306. The corrected profile may be indicative of internal/inherent stresses of the substrate. The corrected profile may be indicative of out-of-plane distortion of the substrate. The corrected profile may be utilized in determining in-plane distortion of the substrate. The corrected profile may be utilized in determining overlay error of the substrate. The corrected profile may be utilized in determining, recommending, and/or performing a corrective action in association with the substrate, the manufacturing equipment, or the like.

In-plane distortion (e.g., overlay error between layers of a substrate) may be determined based on measured out-of-plane distortion of the substrate. In-plane distortion is related to a local slope of the substrate (e.g., as measured via out-of-plane distortion measurements). In-plane distortion may be proportional to local slope of the substrate. Precise location-depending quantification of out-of-plane distortion of the substrate may enable determination of in-plane distortion of the substrate (e.g., overlay error). Determination of in-plane distortion enables performance of one or more corrective actions based on the determined in-plane distortion, e.g., for correcting for the distortion, for updating processing of subsequent substrates to mitigate in-plane distortion errors, to provide an alert to a user, etc. In-plane distortion may be provided as input to tools/manufacturing equipment associated with further substrate processing operations. Corrections may be made for in-plane distortion in subsequent processing operations. For example, in-plane distortion values may be provided to a lithography system, which may correct for the in-plane distortion (e.g., overlay error) in subsequent processing operations of the substrate.

Figure 4:
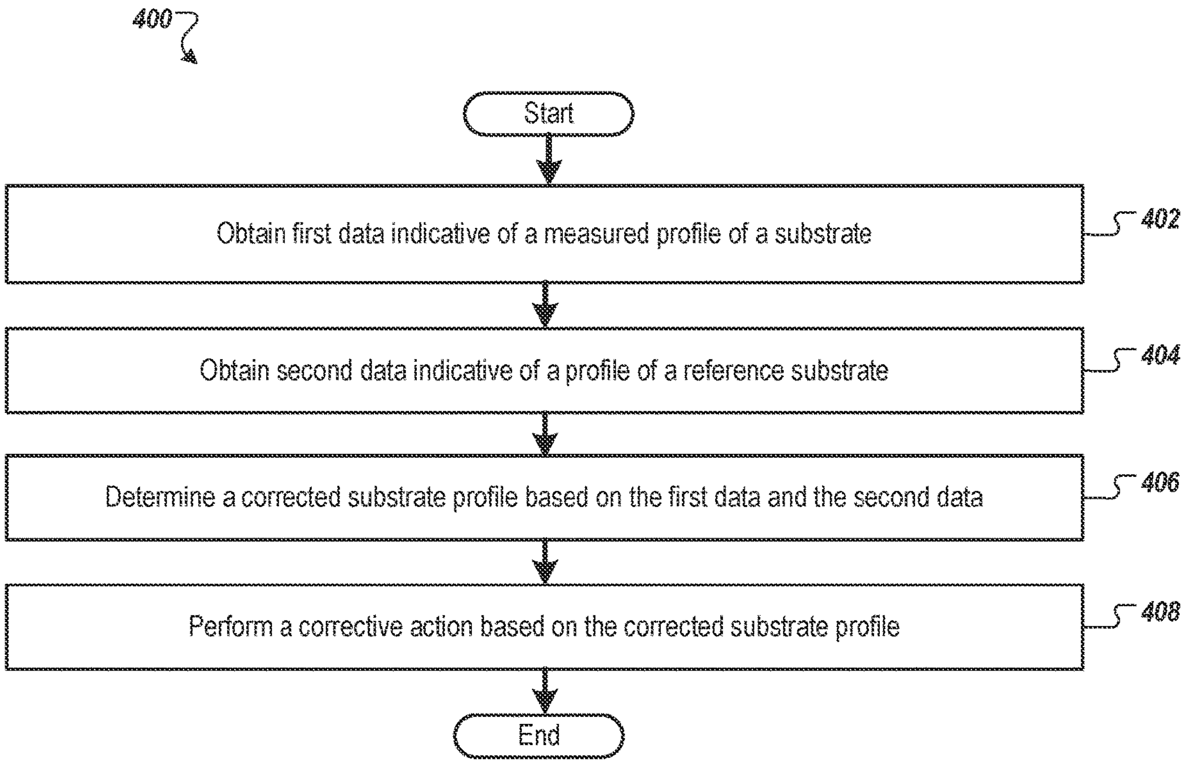
FIG. 4 is a flow diagram of a method for performing a corrective action based on a profile of a reference substrate and a target substrate, according to some embodiments.

FIG. 4 is a flow diagram of a method 400 for performing a corrective action based on a profile of a reference substrate and a target substrate, according to some embodiments. At block 402, processing logic obtains first data indicative of a measured profile of a substrate. The first data may be measured by a displacement sensor. The first data may be measured in a metrology chamber of a processing system. The first data may be measured by a confocal displacement sensor. The first data may be measured while the substrate is disposed on a measurement stage. The first data may be measured while the substrate is disposed in a horizontal position. The first data may be measured while the substrate is disposed on a stage configured to reduce deflection due to gravity, such as an extended 3-point support stage.

The first data may include data from a number of locations of the substrate. Generating the first data may include translating the substrate such that various locations of the substrate are brought within a field of view of a measurement device. Generating the first data may include scanning displacement measurements across the substrate. The substrate may be scanned in a grid pattern, a radial pattern, a spiral pattern, or another convenient pattern.

In some embodiments, the reference substrate may be a bare substrate, e.g., a substrate of similar composition to a base material of the target substrate. In some embodiments, the reference substrate may be selected to be sufficiently similar to the target substrate to provide a meaningful reference (e.g., within a target error threshold). In some embodiments, the reference substrate may be the same substrate as the target substrate, at a different stage of processing. For example, the reference substrate may be the substrate before one or more substrate processing operations of interest are performed, and the target substrate may be the substrate after the one or more substrate processing operations of interest are performed.

At block 404, processing logic obtains second data indicative of a profile of a reference substrate. Operations of block 404 may share one or more features with operations of block 402. Data of block 404 may share one or more features with data associated with block 402.

At block 406, processing logic determines a corrected substrate profile based on the first data and the second data. Determining a corrected substrate profile may include calculating a difference between the first and second data. In some embodiments, the first and second data may be utilized in determining inherent stresses of the substrate. In some embodiments, the first and second data may be utilized in correcting for gravity-induced deflection of the substrate. In some embodiments, the first and second data may be utilized in determining an out-of-plane distortion of the substrate. In some embodiments, in-plane distortion may further be determined based on the first and second data. In some embodiments, an overlay error of the substrate may be determined based on the first and second data.

At block 408, processing logic performs a corrective action based on the corrected substrate profile. The corrective action may include providing an alert to a user. The corrective action may include updating a process recipe. The corrective action may include flagging the substrate for further investigation. The corrective action may include flagging the substrate as defecting. The corrective action may include scheduling maintenance of processing equipment, such as cleaning, seasoning, component replacement, etc. The corrective action may include updating one or more processing parameters based on the corrected substrate profile. For example, voltages of different sectors of a chucking apparatus may be adjusted to increase flatness of the substrate while undergoing subsequent processing operations. Accuracy of subsequent processing operations (e.g., lithography operations) may be improved by providing chucking force that enables increased flatness of the substrate. The corrective action may further be based on data associated with the corrected substrate profile, such as out-of-plane distortion, in-plane distortion, inherent stresses, overlay error, etc.

Figure 5:
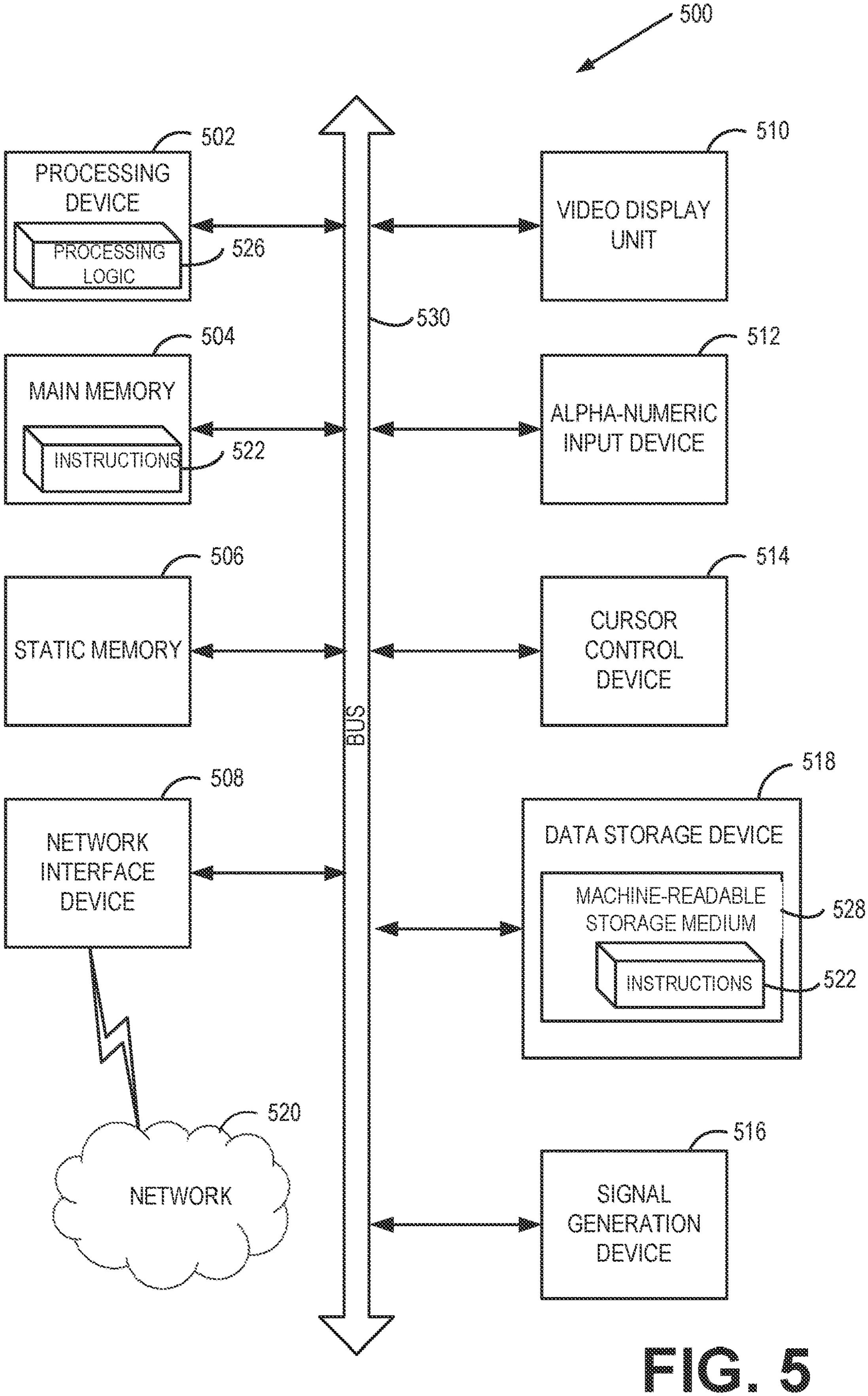
FIG. 5 depicts a block diagram of an example computing device, according to some embodiments.

FIG. 5 depicts a block diagram of an example computing device 500, operating in accordance with one or more aspects of the present disclosure. In various illustrative examples, various components of the computing device 500 may represent various components of the controller 109, of FIG. 1, or another computing device configured to perform substrate distortion profiles, perform and/or recommend corrective actions based on substrate distortion profiles, etc.

Example computing device 500 may be connected to other computer devices in a LAN, an intranet, an extranet, and/or the Internet. Computing device 500 may operate in the capacity of a server in a client-server network environment. Computing device 500 may be a personal computer (PC), a set-top box (STB), a server, a network router, switch or bridge, or any device capable of executing a set of instructions (sequential or otherwise) that specify actions to be taken by that device. Further, while only a single example computing device is illustrated, the term "computer" shall also be taken to include any collection of computers that individually or jointly execute a set (or multiple sets) of instructions to perform any one or more of the methods discussed herein.

Example computing device 500 may include a processing device 502 (also referred to as a processor or CPU), a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a secondary memory (e.g., a data storage device 518), which may communicate with each other via a bus 530.

Processing device 502 represents one or more general-purpose processing devices such as a microprocessor, central processing unit, or the like. More particularly, processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 502 may be configured to execute instructions implementing method 400 of FIG. 4. Processing device may include processing logic 526.

Example computing device 500 may further comprise a network interface device 508, which may be communicatively coupled to a network 520. Example computing device 500 may further comprise a video display 510 (e.g., a liquid crystal display (LCD), a touch screen, or a cathode ray tube (CRT)), an alphanumeric input device 512 (e.g., a keyboard), a cursor control device 514 (e.g., a mouse), and an acoustic signal generation device 516 (e.g., a speaker).

Data storage device 518 may include a computer-readable storage medium (or, more specifically, a non-transitory machine-readable storage medium) 528 on which is stored one or more sets of executable instructions 522. In accordance with one or more aspects of the present disclosure, executable instructions 522 may comprise executable instructions associated with any of the methods disclosed herein, e.g., instructions for performing any methods disclosed herein. Instructions 522 may include instructions for determining distortion of a target substrate. Instructions 522 may include instructions for recommending corrective actions based on substrate distortion. Instructions 522 may include instructions for performing corrective cations based on substrate distortion. Executable instruction 522 may be associated with executing methods illustrated in FIG. 4.

Executable instructions 522 may also reside, completely or at least partially, within main memory 504 and/or within processing device 502 during execution thereof by example computing device 500, main memory 504 and processing device 502 also constituting computer-readable storage media. Executable instructions 522 may further be transmitted or received over a network via network interface device 508.

While the computer-readable storage medium 528 is shown in FIG. 5 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," "receiving," "processing," "generating," "triggering," "training," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, compact disc read only memory (CD-ROMs), and magnetic-optical disks, read-only memories (ROMs), random access memories (RAMs), erasable programmable read-only memory (EPROMs), electrically erasable programmable read-only memory (EEPROMs), magnetic disk storage media, optical storage media, flash memory devices, other type of machine-accessible storage media, or any type of media suitable for storing electronic instructions, each coupled to a computer system bus.

The preceding description sets forth numerous specific details such as examples of specific systems, components, methods, and so forth in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." When the term "about" or "approximately" is used herein, this is intended to mean that the nominal value presented is precise within +10%.

Although the operations of the methods herein are shown and described in a particular order, the order of operations of each method may be altered so that certain operations may be performed in an inverse order so that certain operations may be performed, at least in part, concurrently with other operations. In another embodiment, instructions or sub-operations of distinct operations may be in an intermittent and/or alternating manner.

It is understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
- obtaining, with a displacement sensor of an electronics processing system, first data indicative of a measured profile of a substrate;
- obtaining second data indicative of a profile of a reference substrate;
- determining an out-of-plane distortion of the substrate by subtracting the second data from the first data; and
- performing a corrective action based on the out-of-plane distortion, wherein the corrective action comprises:
  - determining, based on the out-of-plane distortion, a sector of the substrate to be flattened;
  - adjusting at least one parameter associated with a holding force of a sector of a holding device, the sector of the holding device corresponding to the sector of the substrate; and
  - applying, with the sector of the holding device in a subsequent processing step, the holding force to flatten the sector of the substrate.

2. The method of claim 1, further comprising determining an overlay error of the substrate based on the out-of-plane distortion.

3. The method of claim 1, further comprising performing a plurality of measurements of substrate displacement at a plurality of locations of the substrate, wherein the measured profile of the substrate is based on the plurality of measurements.

4. The method of claim 1, wherein the measured profile is based on measurements of the substrate performed after a target processing operation, and wherein the profile of the reference substrate is based on measurements of the substrate performed before the target processing operation.

5. The method of claim 1, further comprising disposing the substrate on a measurement stage, the measurement stage comprising a stage for reduction of gravity-induced substrate deflection, and wherein the measured profile of the substrate is determined based on measurements taken while the substrate is on the measurement stage.

6. The method of claim 5, wherein the measurement stage comprises a three-point substrate support stage.

7. The method of claim 5, wherein the measurement stage comprises a plurality of support points radially disposed around a center of the measurement stage at a support radius.

8. The method of claim 7, wherein a substrate radius is greater than the support radius by factor of approximately $\sqrt{2}$ (square root of two).

9. The method of claim 1, wherein the holding device is an electrostatic chuck, and wherein the at least one parameter comprises a voltage to a sector of the electrostatic chuck.

10. A non-transitory machine-readable storage medium storing instructions which, when executed, cause a processing device to perform operations comprising:
- obtaining, with a displacement sensor of an electronics processing system, first data indicative of a measured profile of a substrate;
- obtaining second data indicative of a profile of a reference substrate;
- determining an out-of-plane distortion of the substrate by subtracting the second data from the first data; and
- performing a corrective action based on the out-of-plane distortion, wherein the corrective action comprises:
  - determining, based on the out-of-plane distortion, a sector of the substrate to be flattened;
  - adjusting at least one parameter associated with a holding force of a sector of a holding device, the sector of the holding device corresponding to the sector of the substrate; and
  - applying, with the sector of the holding device in a subsequent processing step, the holding force to flatten the sector of the substrate.

11. The non-transitory machine-readable storage medium of claim 10 wherein the operations further comprise determining an overlay error of the substrate based on the out-of-plane distortion.

12. The non-transitory machine-readable storage medium of claim 10, wherein the operations further comprise performing a plurality of measurements of substrate displacement at a plurality of locations of the substrate, wherein the measured profile of the substrate is based on the plurality of measurements.

13. The non-transitory machine-readable storage medium of claim 10, wherein the measured profile is based on measurements of the substrate performed after a target processing operation, and wherein the profile of the reference substrate is based on measurements of the substrate performed before the target processing operation.

14. The non-transitory machine-readable storage medium of claim 10, wherein the operations further comprise disposing the substrate on a measurement stage, the measurement stage comprising a stage for reduction of gravity-induced substrate deflection, and wherein the measured profile of the substrate is determined based on measurements taken while the substrate is on the measurement stage.

15. A system, comprising memory and a processing device coupled to the memory, wherein the processing device is configured to:
- obtain, with a displacement sensor of an electronics processing system, first data indicative of a measured profile of a substrate;
- obtain second data indicative of a profile of a reference substrate;
- determine an out-of-plane distortion of the substrate by subtracting the second data from the first data; and perform a corrective action based on the out-of-plane distortion, wherein the corrective action comprises:

determining, based on the out-of-plane distortion, a sector of the substrate to be flattened;

adjusting at least one parameter associated with a holding force of a sector of a holding device, the sector of the holding device corresponding to the sector of the substrate; and applying, with the sector of the holding device in a subsequent processing step, the holding force to flatten the sector of the substrate.

16. The system of claim 15, wherein the processing device is further configured to determine an overlay error of the substrate based on the out-of-plane distortion, wherein the corrective action is further based on the overlay error.

17. The system of claim 15, wherein the processing device is further configured to perform a plurality of measurements of substrate displacement at a plurality of locations of the substrate, wherein the measured profile of the substrate is based on the plurality of measurements.

18. The system of claim 15, wherein the measured profile is based on measurements of the substrate performed after a target processing operation, and wherein the profile of the reference substrate is based on measurements of the substrate performed before the target processing operation.

19. The system of claim 15, wherein the measured profile is based on measurements of the substrate performed while the substrate is disposed on a measurement stage, the measurement stage comprising a stage for reduction of gravity-induced substrate deflection.

* * * * *